United States Patent [19]
Zacherl

[11] 4,351,577
[45] Sep. 28, 1982

[54] WIRE RING BEARING

[75] Inventor: Anton Zacherl, Munich, Fed. Rep. of Germany

[73] Assignee: MTU Motoren-und Turbinen-Union Munchen GmbH, Munich, Fed. Rep. of Germany

[21] Appl. No.: 193,183

[22] Filed: Oct. 1, 1980

[30] Foreign Application Priority Data

Oct. 4, 1979 [DE] Fed. Rep. of Germany ....... 2940206

[51] Int. Cl.$^3$ ......................... F16C 27/04; F16C 33/61
[52] U.S. Cl. ............................ 308/189 R; 308/184 R; 308/189 A; 308/196
[58] Field of Search ................ 308/189 R, 189 A, 196, 308/197, 188, 184 R, 195

[56] References Cited

U.S. PATENT DOCUMENTS

| | | | |
|---|---|---|---|
| 1,606,127 | 11/1926 | Kolb | 308/196 |
| 2,270,542 | 1/1942 | Martin et al. | 308/196 |
| 2,949,036 | 8/1960 | Ellis | 308/189 R |
| 3,144,278 | 8/1964 | Pöhler et al. | 308/189 R |

*Primary Examiner*—Lenard A. Footland

*Attorney, Agent, or Firm*—Posnack, Roberts, Cohen & Spiecens

[57] ABSTRACT

A wire ring bearing for an actuating guide apparatus for a gas turbine comprising two bearing rings concentrically arranged for relative motion with respect to one another between which is a plurality of rolling elements which are rollably supported on wire rings mounted in pairs respectively provided in circumferentially extending slots in the two bearing rings. One of the bearing rings comprises a plurality of individual ring elements which jointly define the slot in the corresponding bearing ring. A fastener secures the ring elements together with a spring interposed between the fastener and one of the individual ring elements. The fastener is engaged in a sleeve having a flange bearing against the head of the fastener and the spring has one end bearing against the flange and an opposite end bearing against the associated individual ring element. In this way any differential thermal expansions taking place between the individual ring elements will be taken up by displacement of the ring elements against the action of the spring thereby preventing stresses in the bearing which could interfere with movement of the other ring.

5 Claims, 1 Drawing Figure

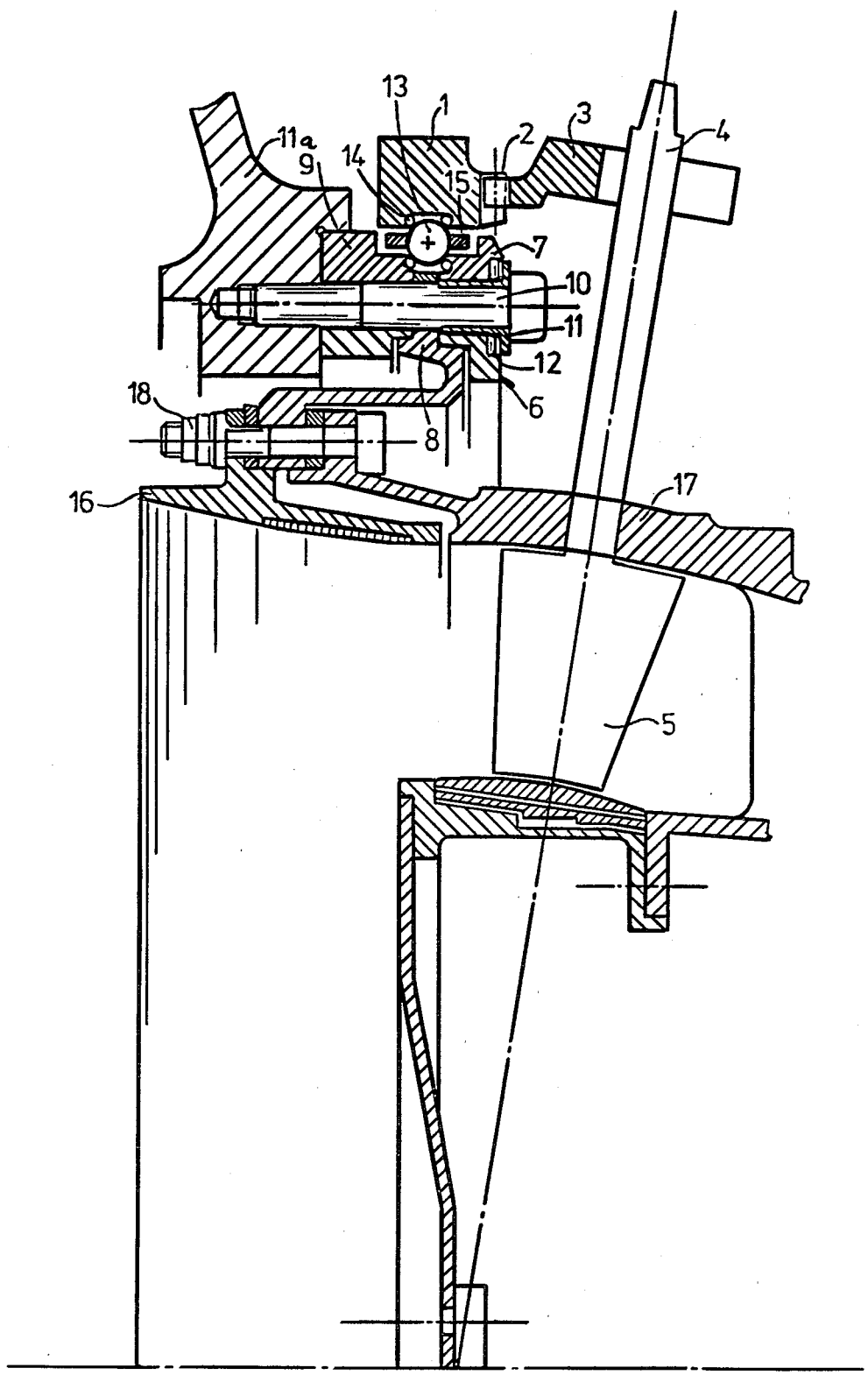

WIRE RING BEARING

FIELD OF THE INVENTION

This invention relates to a wire ring bearing having two bearing rings arranged concentrically for relative motion one with respect to the other, disposed between which is a plurality of rolling elements arranged for rolling movement on wire rings arranged in two opposite, circumferentially extending slots in the bearing rings, where at least one of the two bearing rings is composed of several individual rings which jointly form the slot extending in said bearing ring and which are held together by fasteners.

BACKGROUND

It has been found that with wire ring bearings of the above type, different thermal expansions of the individual rings may cause stresses in the bearings that will interfere with the relative movement of the two bearing rings with respect to one another.

SUMMARY OF THE INVENTION

An object of the present invention is to provide wire ring bearings of the above type in which the stresses that interfere with the moveability of the bearing rings as a result of different thermal expansions of the individual rings are substantially prevented.

It is a further object of the present invention to provide an arrangement where the individual rings of one bearing ring are resiliently held together. This can be achieved by arranging a spring, which may be in the shape of a corrugated spring, between the fasteners and one of the individual rings.

The individual rings of said one bearing ring can be attached to a stationary component using screws as fasteners, where each screw is then carried through a sleeve arranged in a hole in the individual ring nearest the head of the screw and is urged by the screw at one end against the adjacent individual ring, where the spring is arranged between the other end of the sleeve, which is the one on which the head of the screw is pressing and which takes the shape of a flange, and the individual ring nearest the head of the screw, and where said individual ring is arranged for endwise movement relative to the sleeve against the pressure of the spring.

The wire spring bearing of the present invention finds preferred use on an actuating guide apparatus for gas turbines.

BRIEF DESCRIPTION OF THE DRAWING

An embodiment of the present invention is described more fully below in light of the accompanying drawing, the sole FIGURE of which is an axial sectional view illustrating an actuating guide apparatus of a gas turbine fitted with a wire ring bearing of the present invention. For reasons of symmetry, only the upper half of the guide apparatus is shown.

DETAILED DESCRIPTION

The gas turbine guide apparatus comprises a wire ring bearing the outer ring 1 of which has a row of teeth 2 on its face. Meshing with these teeth 2 are the teeth of levers 3 each of which is connected to the shank 4 of a variable guide vane 5.

The inner ring 6 of the wire ring bearing consists of several individual rings 7, 8 and 9 which abut against one another and which are secured to a housing component 11a by means of screws 10. Each screw 10 is carried through a sleeve 11 arranged in the individual ring 7. The end of the sleeve against which the head of the screw bears, has a flange, and the other end of the sleeve 11 is urged, by the screw, against the individual ring 8. Arranged between the flanged end of the sleeve 11 and the individual ring 7 is a corrugated spring 12 which is urged, by the screw 10 and via the flanged end of the sleeve 11, against the individual ring 7. The individual ring 7 is arranged for endwise movement relative to the sleeve 11 against the pressure of the corrugated spring 12.

Disposed between the outer ring 1 and the inner ring 6, which consists of individual rings 7, 8, 9, is a plurality of rolling elements 13 rolling on four wire rings 14. Two wire rings 14 are arranged in pairs respectively engaged in slots incorporated in the inner surface of the outer ring 1 and the outer surface of the inner ring 6. The slot in the inner ring 6 is formed jointly by all three individual rings 7, 8 and 9. The rolling elements 13 are surrounded by a cage 15.

The individual ring 8 is a structural member attached to which by means of bolts 18 is an annular cover 16 for rotor blades (not shown) and a wall member 17.

When different thermal expansions occur between the individual ring 7 on the one hand and the individual rings 8 and 9 on the other, the individual ring 7 is displaced against the action of the spring 12, thus preventing stresses in the bearing that might interfere with movement of the outer ring 1, said movement being transmitted to the guide vanes.

What is claimed is:

1. A wire ring bearing comprising two bearing rings concentrically arranged for relative motion with respect to one another, a plurality of rolling elements disposed between said rings, said rings being provided with opposed circumferentially extending slots, wire rings in said slots rollably supporting said rolling elements, one of the two bearing rings comprising a plurality of individual ring elements which jointly define the slot extending in said one bearing ring, fastener means holding said ring elements together in assembled relation, and means resiliently engaging said individual ring elements in the assembled relation, said means resiliently engaging said individual ring elements in the assembled relation comprising a spring arranged between the fastener means and one of said individual ring elements, said fastener means comprising a screw, a sleeve in a hole provided in said one individual ring element, said screw bearing against said sleeve to urge the same and said one individual ring element against an adjacent second individual ring element, said spring being arranged between said sleeve and said one individual ring element, said one individual ring element being supported for endwise movement relative to the sleeve against the pressure of said spring.

2. A wire ring bearing as claimed in claim 1 wherein said spring is a corrugated spring.

3. A wire ring bearing as claimed in claim 1 wherein said sleeve includes a flange against which one end of said spring bears, said screw having a head against which the other end of said spring bears.

4. A wire ring bearing as claimed in claim 3 wherein said ring elements are three in number arranged in axial sequence on said screw, the second ring element being interposed between the first and third ring elements and bearing thereagainst under the action of said spring.

5. A wire ring bearing as claimed in claim 1 comprising an actuating guide apparatus for a gas turbine.

* * * * *